United States Patent [19]
Ueda et al.

[11] Patent Number: 5,637,337
[45] Date of Patent: Jun. 10, 1997

[54] ANTIFOAMING AGENT FOR FOOD AND FOOD MATERIAL CONTAINING THE SAME

[75] Inventors: Mikio Ueda, Toyonaka; Seishi Takenawa, Nara, both of Japan

[73] Assignee: Fujisawa Pharmaceutical Co., Ltd., Osaka, Japan

[21] Appl. No.: 454,197

[22] PCT Filed: Dec. 9, 1993

[86] PCT No.: PCT/JP93/01793

§ 371 Date: Sep. 7, 1995

§ 102(e) Date: Sep. 7, 1995

[87] PCT Pub. No.: WO94/14337

PCT Pub. Date: Jul. 7, 1994

[30] Foreign Application Priority Data

Dec. 21, 1992 [JP] Japan .................................. 4-356254

[51] Int. Cl.⁶ .................................................. A23L 1/03

[52] U.S. Cl. ..................... 426/329; 426/658; 426/662
[58] Field of Search ............................ 426/329, 662, 426/658

[56] References Cited

U.S. PATENT DOCUMENTS 4,143,170  3/1979  Finucane et al. ..................... 426/329

FOREIGN PATENT DOCUMENTS 54-28920  12/1980  Japan .
0333763   5/1989   Japan .

*Primary Examiner*—Helen Pratt
*Attorney, Agent, or Firm*—Oblon, Spivak, McClelland, Maier & Neustadt, P.C.

[57]  ABSTRACT

A powdery antifoaming agent for food containing straight chain fatty acid glycerol monoester, lecithin, an agent for improving the water dispersibility and a powdery dextrin.

10 Claims, No Drawings

ANTIFOAMING AGENT FOR FOOD AND FOOD MATERIAL CONTAINING THE SAME

TECHNICAL FIELD

This invention relates to an antifoaming agent for food and also to a material for food containing the same.

BACKGROUND ART

With respect to an antifoaming agent for food, mostly a liquid-type agent mainly composed of silicone resin and a powder-type or a liquid-type agent mainly composed of hydrogenated oil or glycerol fatty acid ester have been used (refer, for example, to Japanese Laid-Open Patent Publication Hei-04/20,257).

With regard to the use of the antifoaming agent, a method wherein the agent is added during the steps of manufacturing the food and one in which it is previously added to the food materials have been employed. When the latter method is used, there is a disadvantage in that the liquid-type antifoaming agent is hard to use in case the food material is powdery and that the agent of a powder type mainly composed of hydrogenated oil or glycerol fatty acid ester has a bad dispersibility in water and exhibits almost no antifoaming ability at ambient temperature. The inventors of this invention have conducted an extensive study for an antifoaming agent which is powdery, exhibits a good dispersibility in water and is able to be expected to have a satisfactory antifoaming effect even at ambient temperature and have achieved this invention.

DISCLOSURE OF THE INVENTION

This invention is characterized in that a straight chain fatty acid glycerol monoester, lecithin and an agent for improving water dispersibility are mixed (adsorbed) with powdery dextrin.

Suitable "agent for improving water dispersibility" are polyglycerol poly-ricinoleates, sucrose fatty acid esters, sorbitan fatty acid esters and octenylsuccinic acid-starch and, more preferably, polyglycerol poly-ricinoleates.

Preferred "straight chain fatty acid glycerol monoesters" are $C_{14}$–$C_{22}$ saturated or unsaturated straight chain glycerol esters or a mixture of any of them such as the monoglycerides made from hydrogenated tallow oil, an oleic acid monoglyceride and the monoglycerides made from hydrogenated fish oil. The amount of the monoglyceride contained in the straight chain fatty acid monoester is not necessarily high but it is possible to use an amount of about 40–60%, for example.

"Powdery dextrin" includes that which is commonly used and, of such a type, porous dextrin is preferred in terms of adsorb ability.

Suitable "lecithin" includes natural ones such as soybean lecithin, egg yolk lecithin, etc. as well as synthetic ones.

If necessary, the powdery antifoaming agent for food may contain antifoaming components such as lower fatty acid (having about 6–12 carbons) diglycerides and silicone resin; diluents such as edible fat/oil; and various types of sugars such as maltose and glucose for improving the fluidity of the powder.

Straight chain fatty acid glycerol monoester, lecithin and an agent for improving the water dispersibility are mixed, dissolved and adsorbed with dextrin to give a powder whereupon an antifoaming agent exhibiting good water dispersibility and being apt to give antifoaming ability even at ambient temperature is obtained. In the case of an antifoaming agent for the step of manufacturing food made from soybean milk and egg white powder, the antifoaming effect can be further promoted when an inorganic salt (preferably, calcium carbonate, magnesium carbonate, tricalcium phosphate, etc.) is compounded with the above-mentioned components.

Adsorption of the straight chain fatty acid glycerol monoester, lecithin and the agent for improving the water dispersibility with the powdery dextrin is carried out as follows. Thus, when the straight chain fatty-acid glycerol monoester, lecithin and the water dispersibility improving agent in a liquid state are used, all of the components except for dextrin are homogeneously mixed followed by mixing with dextrin. When the straight chain fatty-acid monoester, lecithin and the water-dispersibility-improving agent which is a solid or a paste at ambient temperature are used, they are dissolved by heating to mix them homogeneously followed by mixing this with dextrin. When the above-mentioned inorganic salt is added, it may be homogeneously mixed with all of the components except for dextrin followed by mixing with dextrin or it may be added after mixing the components with dextrin. Thus, it may be added at any stage.

Mixing ratio of the components are that about 5–50 parts (by weight; all parts given hereinafter are those by weight too) (preferably about 5–20 parts) of a liquid prepared by mixing 1–20 parts (preferably 5–10 parts) of straight chain fatty acid glycerol monoester, 1–20 parts (preferably 2–10 parts) of lecithin and 0.5–5 parts (preferably 1–3 parts) of a water dispersibility improving agent is mixed with 100 parts of dextrin. When an inorganic salt is added, about 1–10 parts of the salt are added to the antifoaming agent which is prepared as mentioned above, for example.

Each and everyone of these components may be used either solely or jointly.

One of the most preferred compositions among the antifoaming agent for food according to this invention is that which comprises glycerol fatty acid monoester manufactured from hydrogenated tallow oil as the straight chain fatty acid glyceride monoester; lecithin; polyglycerol poly-ricinoleate as the water dispersibility improving agent; and a porous dextrin as the powdery dextrin.

The mode of use of the powdery antifoaming agent for food according to this invention will be that it is mixed with a food material or it is added during the step of manufacturing the food. In the latter case, the same mode as that in the conventional antifoaming agent will be employed such as that the agent in a powdery form is added or that said antifoaming agent is once dissolved in water and then a certain amount of the solution is directly added or the solution is directly sprayed onto the place where the foams are generated.

An example of the methods wherein the generation of foams during the stage of manufacturing the food is prevented by the prior addition of the antifoaming agent to the food additive is a method in which the antifoaming agent is mixed with the coagulating agent used in the manufacture of soybean curd so that the foaming during the step of coagulation by adding soybean milk thereto is inhibited whereby soybean curd with a high quality is manufactured.

The powdery antifoaming agent for food, in accordance with this invention, is used for food material which relatively easily generates foams such as stevia powder, various kinds of protein powder (defatted powdery milk, egg white powder, sodium caseinate, cheese whey protein powder, plasma powder, etc.), tea solution, oolong tea solution, coffee solution, potato solution, pudding mix, jelly mix and other processed food materials. The adding amount of the antifoaming agent for food of this invention may vary depending, for example, upon the diluting ratio during the step of processing the food but, suitably, it is about 0.01–1% of the food material.

Since the antifoaming agent of this invention is powdery, there are advantages in that it can be easily mixed with the food material and that, if mixed with the food material previously, generation of the foams during the step of dissolving the food material and in the step of manufacturing the food can be prevented. The antifoaming agent of this invention has a characteristic feature in that it does not require the steps of emulsifying and drying the antifoaming components and, by merely mixing the components, an agent exhibiting good dispersibility in water can be manufactured. When dissolved in water at ambient temperature, an emulsion-type antifoaming agent has a disadvantage in that its use in soft drinks is difficult because of turbidity while the powdery antifoaming agent of this invention is dispersible in water at ambient temperature in an almost transparent manner whereupon it is able to be used for all types of food.

The following tests were conducted to investigate the usefulness of the powdery antifoaming agent of this invention.

Test Method

Each 300 ml of the test solution was placed in a 500 ml beaker, and (1) the antifoaming agent of Example 1 was added at a relative amount of 0.01%, then the mixture was stirred for two minutes using a hand mixer to foam the solution and the height of the foams after one minute from completion of the stirring was measured. For comparison, the same tests were conducted using (2) a powder prepared by mixing 10 g of oleic acid monoglyceride (liquid) (a powdery antifoaming agent exhibiting an antifoaming ability and is used in the step of manufacturing food) with 90 g of powdery dextrin and (3) no antifoaming agent was added.

Test Results

The results of the test are given in the following table.

TABLE

| Liquids Tested | (1) Antifoaming Agent of Example 1 | (2) Oleic Acid Monoglyceride | (3) No addition |
| --- | --- | --- | --- |
| Na Caseinate (3% Soln.) | 17 | 49 | 70 |
| Cheese Whey Protein (10% Soln.) | 8 | 51 | 48 |
| Defatted Powdery Milk (10% Soln.) | 0 | 40 | 66 |
| Tea Solution | 0 | 8 | 43 |
| Oolong Tea Solution | 4 | 40 | 50 |
| Coffee Solution | 9 | 52 | 63 |
| Liquid of Mashed Potato | 6 | 30 | 47 |

(unit: mm)

Tea Solution: Tea leaves (50 g) were extracted with 2 liters of hot water.
Oolong Tea Solution: Oolong tea leaves (46 g) were extracted with 2 liters of hot water.
Coffee Solution: Disintegrated coffee beans (134 g) were extracted with 2 liters of hot water.
Liquid of Mashed Potato: Potato (240 g) was mashed in a mixer together with 2 liters of water.

It is clear from the table that the antifoaming agent of this invention (No.(1)) exhibited an excellent antifoaming effect with all any of the test solutions. The dispersibility in all of the test solutions was good as well.

This invention will now be illustrated by way of the following examples.

EXAMPLE 1

Soybean lecithin (manufactured by Ajinomoto Co. Ltd.) (20 g), 60 g of glycerol fatty acid monoester manufactured from hydrogenated tallow oil (Sunsoft No.2500 manufactured by Taiyo Kagaku Co. Ltd.) and 20 g of polyglycerol poly-ricinoleate (Sunsoft No. 818H manufactured by Taiyo Kagaku Co. Ltd.) were mixed, heated to dissolve and mixed with 900 g of powdery dextrin (Pineflow manufactured by Matsutani Chemicals. Co. Ltd.) to give 1 kg of a powdery antifoaming agent.

EXAMPLE 2

Maltose (300 g) was added to 700 g of the antifoaming agent prepared in Example 1 to give 1 kg of an antifoaming agent wherein the fluidity of the powder was improved.

EXAMPLE 3

Magnesium carbonate (50 g) was added to 950 g of the antifoaming agent prepared in Example 1 to give 1 kg of a powdery antifoaming agent.

EXAMPLE 4

Soybean lecithin (manufactured by Ajinomoto Co. Ltd.) (80 g), 60 g of glycerol fatty acid monoester (Sunsoft No.2500 manufactured by Taiyo Kagaku Co. Ltd.) and 20 g of sucrose fatty acid ester (DK Ester F10 manufactured by Daiichi Kogyo Seiyaku Co. Ltd.) were mixed, heated to dissolve and mixed with 840 g of powdery dextrin (Pineflow manufactured by Matsutani Kagaku Co. Ltd.) to give 1 kg of a powdery antifoaming agent.

EXAMPLE 5

The same process as that in Example 4 was conducted using sorbitan fatty acid ester (Sunsoft No.67N manufactured by Taiyo Kagaku Co. Ltd.) instead of sucrose fatty acid ester to give 1 kg of a powdery antifoaming agent.

EXAMPLE 6

The same operation as in Example 4 was conducted using octenylsuccinic acid starch (Emulstar #30A manufactured by Matsutani Kagaku Co. Ltd.) instead of sucrose fatty acid ester to give 1 kg of a powdery antifoaming agent.

EXAMPLE 7

The antifoaming agent (2 g) prepared in Example 1 was added to 1 kg of defatted powdery milk to give a defatted powdery milk which hardly foamed.

EXAMPLE 8

The antifoaming agent (5 g) prepared in Example 3 was added to 1 kg of egg white powder to give an egg white powder which hardly foamed.

EXAMPLE 9

The antifoaming agent (30 g) prepared in Example 3 was mixed with 1 kg of gluconodeltalactone to give a coagulating agent for the manufacture of soybean curd.

We claim:

1. A powdery antifoaming agent for food consisting essentially of straight chain fatty acid glycerol monoester, lecithin, an agent for improving water dispersibility and a powdery dextrin.

2. The powdery antifoaming agent for food according to claim 1 containing an inorganic salt.

3. The powdery antifoaming agent for food according to claim 1 in which one or more compound(s) selected from the group consisting of polyglycerol poly-ricinoleate, sucrose fatty acid ester, sorbitan fatty acid ester and octenylsuccinic acid starch is/are used as the agent for improving the water dispersibility.

4. The powdery antifoaming agent for food according to claim 1 in which one or more compounds selected from the group consisting of calcium carbonate, magnesium carbonate and tricalcium phosphate is/are used as the inorganic salt.

5. The powdery antifoaming agent for food according to claim 1 in which porous dextrin is used as the powdery dextrin.

6. Material for food containing the powdery antifoaming agent for food of claim 1.

7. The powdery antifoaming agent for food according to claim 1 in which the straight chain fatty acid glycerol monoester is a glycerol fatty acid monoester made from hydrogenated tallow oil, the water-dispersibility-improving agent is a polyglycerol poly-ricinoleate and the powdery dextrin is a porous dextrin.

8. The powdery antifoaming agent of claim 1 additionally containing a sugar in amounts for improving the fluidity of the powder.

9. The powdery antifoaming agent of claim 8, wherein the sugar is maltose.

10. A powdery antifoaming agent for food prepared by mixing 5–50 parts by weight of a liquid obtained by mixing 1–20 parts by weight of straight chain fatty acid glycerol monoester, 1–20 parts by weight of lecithin and 0.5–5 parts by weight of a water-dispersibility-improving agent with 100 parts by weight of dextrin.

* * * * *